US012173880B2

(12) United States Patent
Zou

(10) Patent No.: US 12,173,880 B2
(45) Date of Patent: Dec. 24, 2024

(54) PLUG-IN STRING LAMP STRUCTURE

(71) Applicant: Xinjiang Zou, Meizhou (CN)

(72) Inventor: Xinjiang Zou, Meizhou (CN)

( * ) Notice: Subject to any disclaimer, the term of this patent is extended or adjusted under 35 U.S.C. 154(b) by 378 days.

(21) Appl. No.: 17/848,509

(22) Filed: Jun. 24, 2022

(65) Prior Publication Data

US 2023/0392776 A1 Dec. 7, 2023

(30) Foreign Application Priority Data

Jun. 2, 2022 (CN) ......................... 202221367023.2

(51) Int. Cl.
*F21V 23/06* (2006.01)
*H01R 13/504* (2006.01)
*H01R 25/00* (2006.01)
*H01R 33/09* (2006.01)

(52) U.S. Cl.
CPC ........... *F21V 23/06* (2013.01); *H01R 13/504* (2013.01); *H01R 25/003* (2013.01); *H01R 33/09* (2013.01)

(58) Field of Classification Search
None
See application file for complete search history.

(56) References Cited

U.S. PATENT DOCUMENTS 9,951,909 B2 * 4/2018 Progl ...................... F21K 9/232
12,044,365 B1 * 7/2024 Zou ......................... F21V 31/00
2017/0343169 A1 * 11/2017 Yu ............................ F21S 4/10
2023/0296239 A1 * 9/2023 Zou ....................... F21V 31/005
362/249.16

* cited by examiner

*Primary Examiner* — Oscar C Jimenez
(74) *Attorney, Agent, or Firm* — Jeenam Park

(57) ABSTRACT

The present disclosure discloses a novel plug-in string lamp structure, which comprises a string lamp connecting line, a male connector and a female connector, wherein the string lamp connecting line is provided with a plurality of bulb components arranged in sequence, each bulb component comprises a lamp cap, a luminescent light source and a light-transmitting lampshade; the lamp cap comprises a plastic inner core which is formed with an inner core accommodating cavity, the string lamp connecting line is provided with positive and negative leads, and a positive contact terminal of the positive lead and a negative contact terminal of the negative lead are located in the inner core accommodating cavity; the lamp cap further comprises a rubber-coated member which is injection-molded into an integrated structure with the upper end of the plastic inner core, the outer skin of the positive lead and the outer skin of the negative lead.

10 Claims, 11 Drawing Sheets

PLUG-IN STRING LAMP STRUCTURE

CROSS-REFERENCE TO RELATED APPLICATIONS

This is a U.S. patent application which claims the priority and benefit of Chinese Patent Application Number 202221367023.2, filed on Jun. 2, 2022, the disclosure of which is incorporated herein by reference in its entirety.

TECHNICAL FIELD

The present disclosure relates to the technical field of string lamps, and in particular to a novel plug-in string lamp structure.

BACKGROUND

During Christmas, in order to set off the festive atmosphere, it is necessary for Christmas to decorate with Christmas trees. In order to improve the decoration of Christmas trees, objects are often hung on Christmas trees, and string lamps have become the necessary decorations for Christmas.

It should be pointed out that the bulbs in the existing string lamps generally uses a copper head bulb structure, and the lamp cap bulbs are connected with the corresponding lamp caps in a threaded way to realize light emission during operation. However, the existing copper head bulb has the disadvantages of complicated structure and high manufacturing cost.

SUMMARY

The purpose of the present disclosure is to provide a novel plug-in string lamp structure aiming at the shortcomings of the prior art. The novel plug-in string lamp structure has novel structural design, convenient and quick installation and low manufacturing cost.

In order to achieve the above purpose, the present disclosure is realized by the following technical scheme.

A novel plug-in string lamp structure is provided, comprising a string lamp connecting line, a male connector electrically connected to one end of the string lamp connecting line, and a female connector electrically connected to the other end of the string lamp connecting line, wherein the string lamp connecting line is provided with bulb components which are arranged in sequence at intervals along the string lamp connecting line, and each of the bulb components comprises a lamp cap, a luminescent light source and a light-transmitting lampshade, respectively;

wherein the lamp cap comprises a plastic inner core, the plastic inner core is formed with an inner core accommodating cavity which runs through the plastic inner core from top to bottom completely, the string lamp connecting wire is provided with a positive lead and a negative lead which are inserted into the inner core accommodating cavity, the core of the positive lead is welded or riveted with a positive contact terminal, the core of the negative lead is welded or riveted with a negative contact terminal, and the positive contact terminal and the negative contact terminal are located in the inner core accommodating cavity, respectively;

the lamp cap further comprises a rubber-coated member, and the rubber-coated member is injection-molded into an integrated structure with the upper end of the plastic inner core, the outer skin of the positive lead and the outer skin of the negative lead;

the luminescent light source is provided with a light source positive pin and a light source negative pin, the upper end of the luminescent light source is inserted into the inner core accommodating cavity of the plastic inner core, the light source positive pin of the luminescent light source is in contact with and in electric communication with the positive contact terminal of the positive lead, and the light source negative pin of the luminescent light source is in contact with and in electric communication with the negative contact terminal of the negative lead.

The string lamp connecting line is provided with two signal lines extending into the inner core accommodating cavity, respectively, and the core of each signal line is welded or riveted with a signal terminal, each of the signal terminals extends into the inner core accommodating cavity, and the outer skin of each signal line is injection-molded into an integrated structure with the rubber-coated member, respectively;

the luminescent light source is provided with a signal pin corresponding to each signal terminal, respectively, and each signal pin is in contact with and in electric communication with the corresponding signal terminal, respectively.

A plug-in plastic head is provided at the upper end of the luminescent light source, the light source positive pin, the light source negative pin and the signal pin are exposed to the plug-in plastic head, respectively, the plug-in plastic head of the luminescent light source is inserted into the inner core accommodating cavity of the plastic inner core, and the plug-in plastic head is buckled with the lower end of the plastic inner core.

The plug-in plastic head is provided with a plastic head buckle hole, an inner core buckle tongue corresponding to the plastic head buckle hole is provided at the lower end of the inner wall of the inner core accommodating cavity, and the inner core buckle tongue of the plastic inner core is buckled in the plastic head buckle hole of the plug-in plastic head.

The outer surface of the lower end of the plastic inner core is provided with an inner core positioning protrusion protruding outward, and the plug-in plastic head is provided with a plastic head positioning protrusion corresponding to the inner core positioning protrusion;

when the plug-in plastic head is correctly inserted into the inner core accommodating cavity, the inner core positioning protrusion is vertically aligned with the plastic head positioning protrusion.

The luminescent light source further comprises a luminescent tube and a lamp housing, the light source positive pin, the light source negative pin and the signal pin are provided in the luminescent tube, respectively, and the luminescent tube is embedded in the lamp housing;

the plug-in plastic head is provided with a plastic head fixing hole corresponding to the lamp housing, and the upper end of the lamp housing is embedded in the plastic head fixing hole of the plug-in plastic head.

The inner wall of the plastic head fixing hole is provided with a buckle flange, the outer surface of the upper end of the lamp housing is provided with a buckle groove, and the buckle flange of the plug-in plastic head is buckled into the buckle groove of the lamp housing.

A plastic isolation column for isolating the positive lead from the negative lead is further embedded in the inner core accommodating cavity, and the plastic isolation column is located between the positive contact terminal of the positive lead and the negative contact terminal of the negative lead;

the upper end of the plastic isolation column is injection-molded into an integrated structure with the rubber-coated member.

The lower end of the plastic isolation column is formed with a resistor mounting hole which runs through the plastic isolation column completely in the transverse direction, a protective resistor is mounted in the resistor mounting hole of the plastic isolation column, the protective resistor is provided with a resistor positive pin and a resistor negative pin, the resistor positive pin of the protective resistor is in contact with and in electric communication with the positive contact terminal of the positive lead, and the resistor negative pin of the protective resistor is in contact with and in electric communication with the negative contact terminal of the negative lead.

The rubber-coated member is provided with a lampshade connecting part, and the upper end of the light-transmitting lampshade is screwed or clamped with the lampshade connecting part.

The present disclosure has the following beneficial effect. The present disclosure discloses a novel plug-in string lamp structure, which comprises a string lamp connecting line, a male connector and a female connector, wherein the string lamp connecting line is provided with a plurality of bulb components which are arranged in sequence, and each of the bulb components comprises a lamp cap, a luminescent light source and a light-transmitting lampshade, respectively; the lamp cap comprises a plastic inner core, the plastic inner core is formed with an inner core accommodating cavity, the string lamp connecting line is provided with positive and negative leads, and a positive contact terminal of the positive lead and a negative contact terminal of the negative lead are located in the inner core accommodating cavity, respectively; the lamp cap further comprises a rubber-coated member, and the rubber-coated member is injection-molded into an integrated structure with the upper end of the plastic inner core, the outer skin of the positive lead and the outer skin of the negative lead; the luminescent light source is provided with light source positive and negative pins, the upper end of the luminescent light source is inserted into the inner core accommodating cavity, and the light source positive pin is in contact with and in electric communication with the positive contact terminal, and the light source negative pin is in contact with and in electric communication with the negative contact terminal. Through the structural design, the present disclosure has the advantages of novel structural design, convenient and quick installation and low manufacturing cost.

BRIEF DESCRIPTION OF DRAWINGS

The present disclosure will be further explained by the following drawings, but the embodiments in the drawings do not constitute any restrictions on the present disclosure.

In FIGS. 1 to 11:

Figure 1:
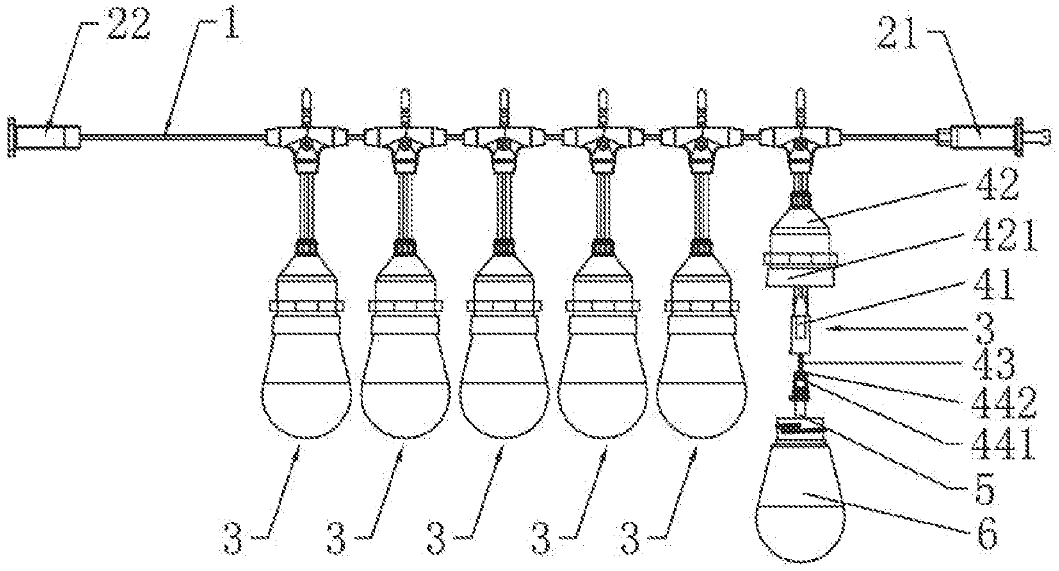
FIG. 1 is a structural schematic diagram of Embodiment 1 of the present disclosure.

1—string lamp connecting line; 111—positive lead
112—positive contact terminal; 121—negative lead
122—negative contact terminal; 131—signal line
132—signal terminal; 21—male connector
22—female connector; 3—bulb component
4—lamp cap; 41—plastic inner core
411—inner core accommodating cavity; 412—inner core buckle tongue
413—inner core positioning protrusion; 42—rubber-coated member
421—lampshade connecting part; 43—plastic isolation column
431—resistor mounting hole; 44—protective resistor
441—resistor positive pin; 442—resistor negative pin
5—luminescent light source; 511—light source positive pin
512—light source negative pin; 52—signal pin
53—plug-in plastic head; 531—plastic head buckle hole
532—plastic head positioning protrusion; 533—plastic head fixing hole
534—buckle flange; 54—luminescent tube
55—lamp housing; 551—buckle groove
6—light-transmitting lampshade

DETAILED DESCRIPTION

The present disclosure will be explained with reference to the following specific embodiments.

Figure 2:
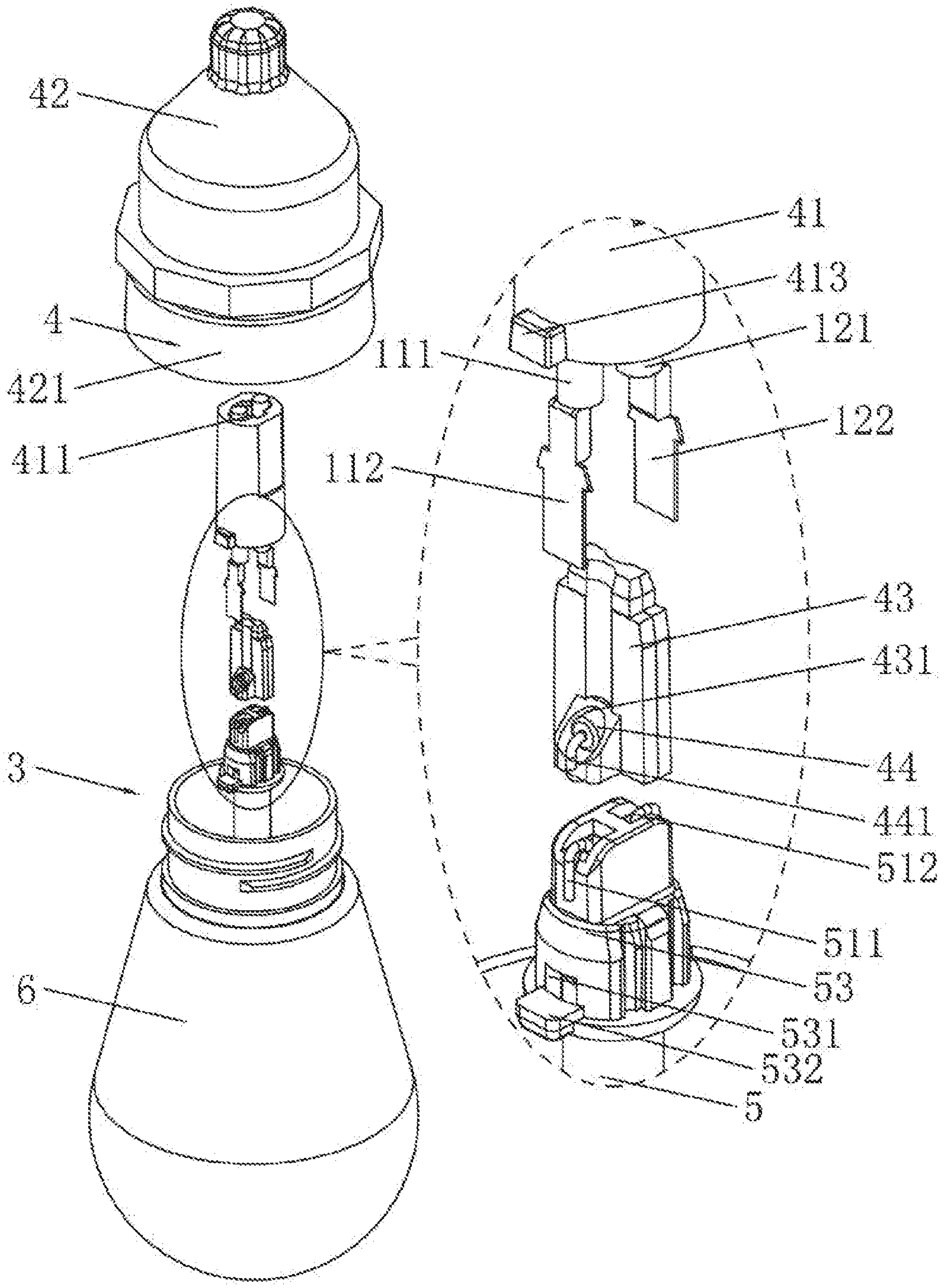
FIG. 2 is an exploded schematic diagram of a bulb component according to Embodiment 1 of the present disclosure.
Figure 3:
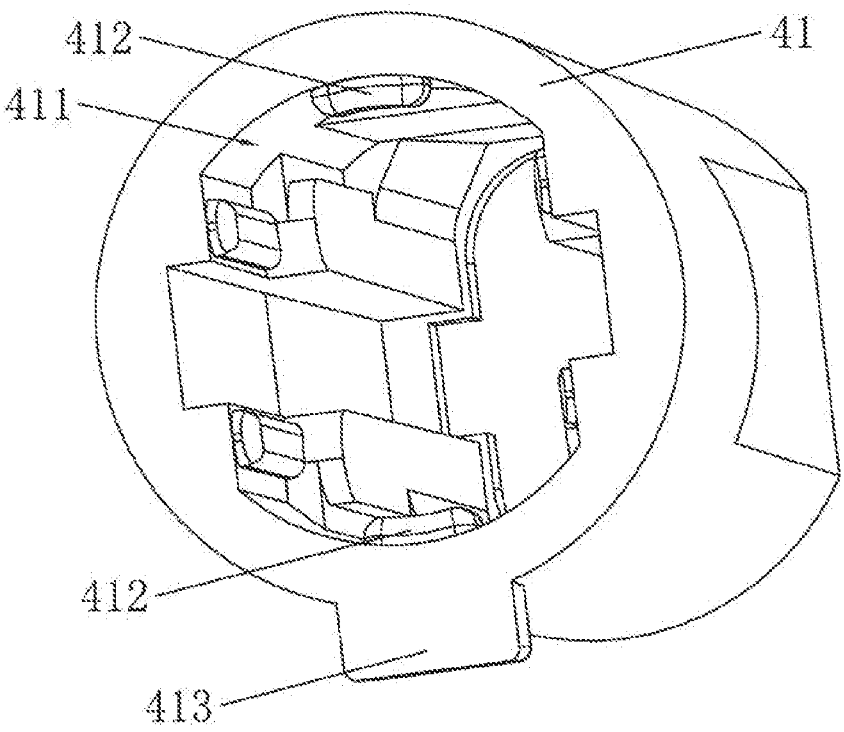
FIG. 3 is a structural schematic diagram of a plastic inner core according to Embodiment 1 of the present disclosure.
Figure 4:
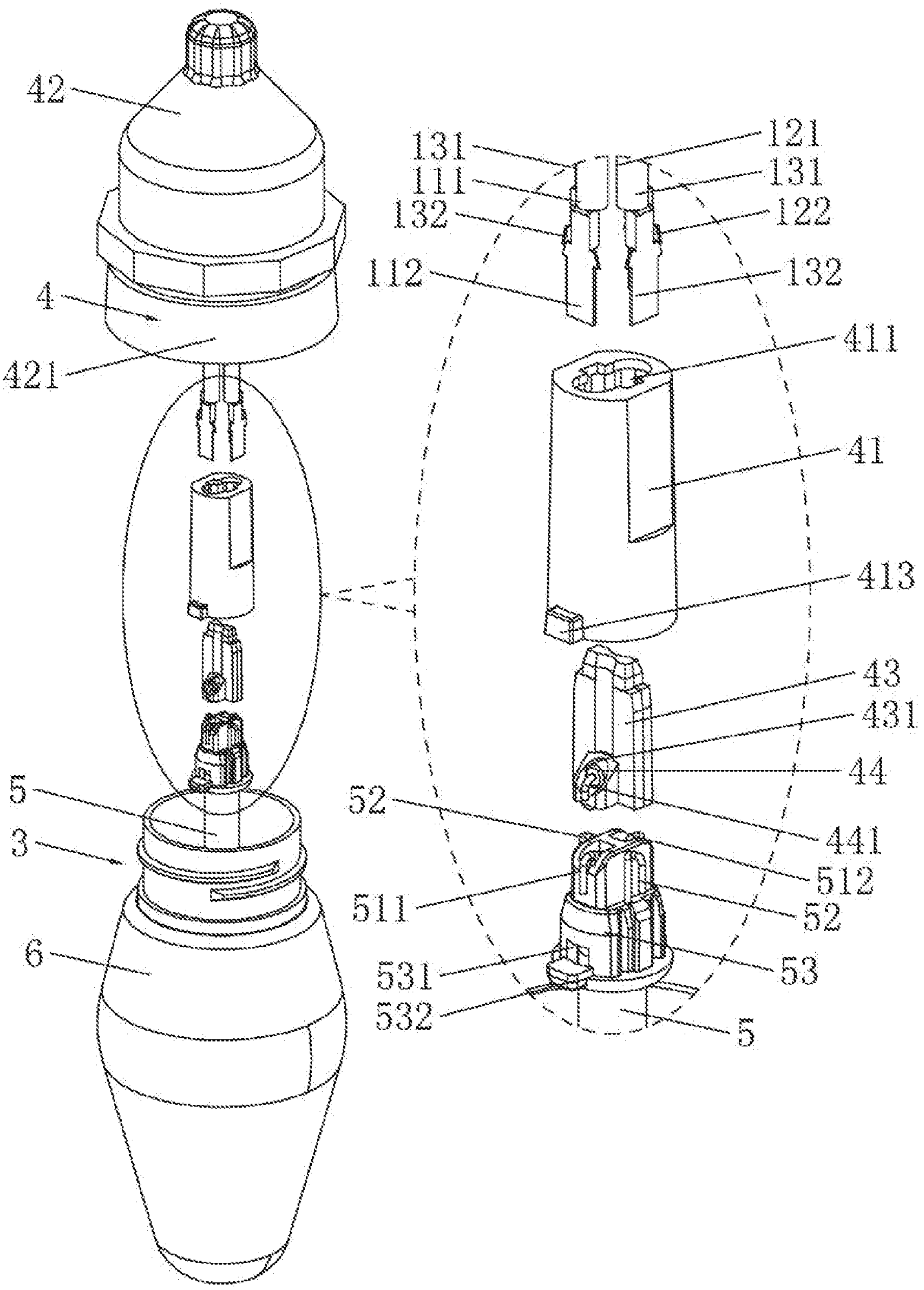
FIG. 4 is an exploded schematic diagram of a bulb component according to Embodiment 2 of the present disclosure.
Figure 5:
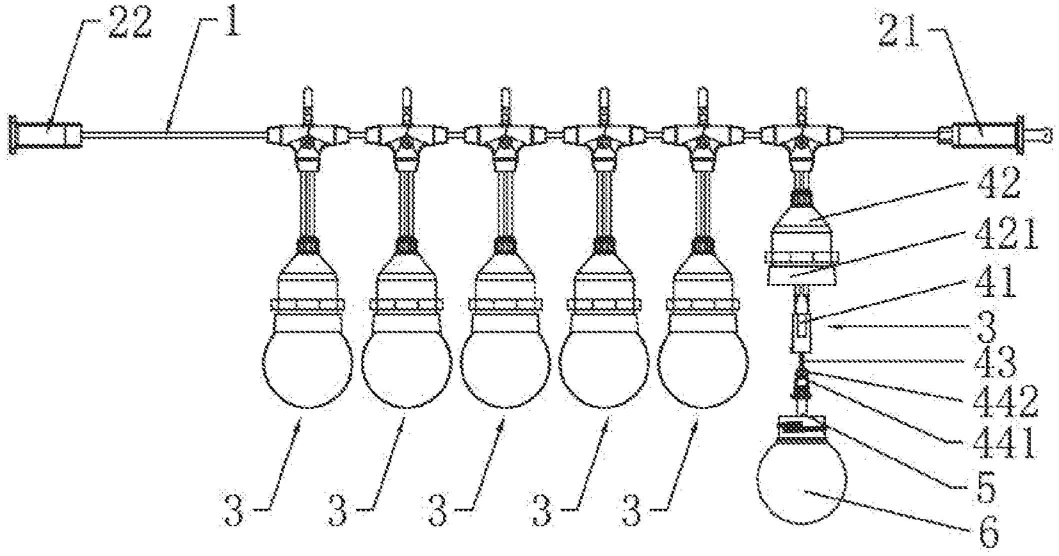
FIG. 5 is a structural schematic diagram of Embodiment 4 of the present disclosure.
Figure 6:
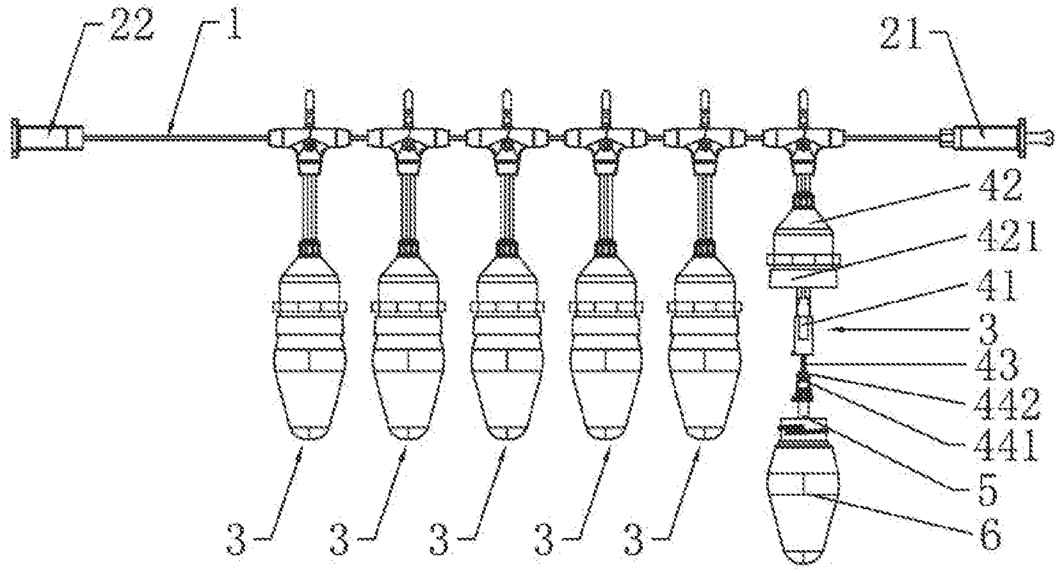
FIG. 6 is a structural schematic diagram of Embodiment 5 of the present disclosure.
Figure 7:
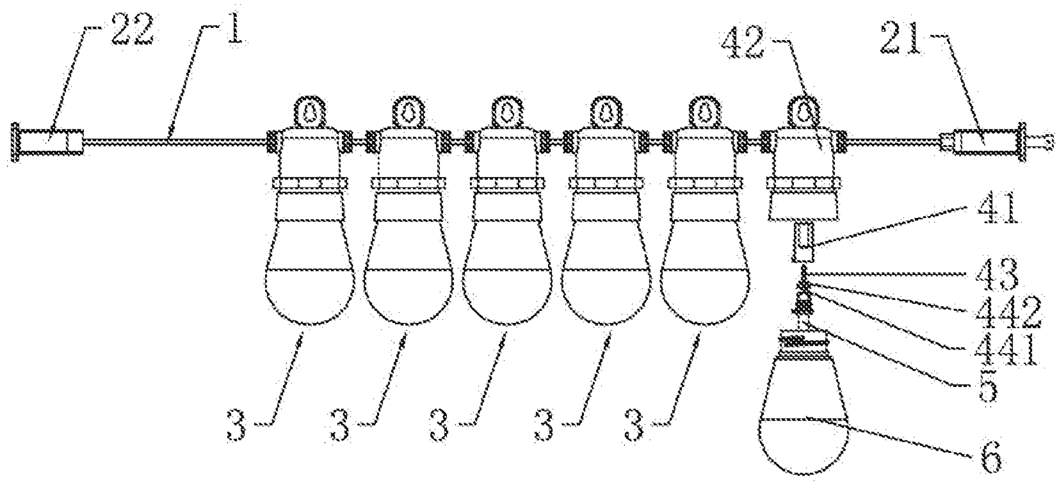
FIG. 7 is a structural schematic diagram of Embodiment 6 of the present disclosure.
Figure 8:
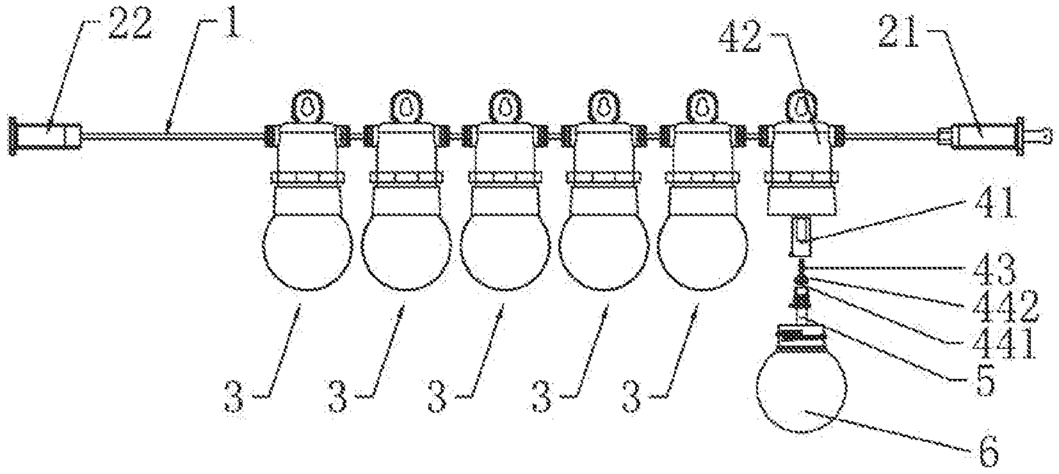
FIG. 8 is a structural schematic diagram of Embodiment 7 of the present disclosure.

As shown in FIG. 1, FIG. 5, FIG. 6, FIG. 7, FIG. 8 and FIG. 9, a novel plug-in string lamp structure comprises a string lamp connecting line 1, a male connector 21 electrically connected to one end of the string lamp connecting line 1, and a female connector 22 electrically connected to the other end of the string lamp connecting line 1, wherein the string lamp connecting line 1 is provided with bulb components 3 which are arranged in sequence at intervals along the string lamp connecting line 1, and each of the bulb components 3 comprises a lamp cap 4, a luminescent light source 5 and a light-transmitting lampshade 6, respectively;

Further, as shown in FIG. 2 to FIG. 4, the lamp cap 4 comprises a plastic inner core 41, the plastic inner core 41 is formed with an inner core accommodating cavity 411 which runs through the plastic inner core from top to bottom completely, the string lamp connecting wire 1 is provided with a positive lead 111 and a negative lead 121 which are inserted into the inner core accommodating cavity 411, the core of the positive lead 111 is welded or riveted with a positive contact terminal 112, the core of the negative lead 121 is welded or riveted with a negative contact terminal 122, and the positive contact terminal 112 and the negative contact terminal 122 are located in the inner core accommodating cavity 411, respectively;

Further, as shown in FIG. 1, FIG. 2, FIG. 4, FIG. 5, FIG. 6, FIG. 7, FIG. 8, and FIG. 9, the lamp cap 4 further comprises a rubber-coated member 42, and the rubber-coated member 42 is injection-molded into an integrated structure with the upper end of the plastic inner core 41, the outer skin of the positive lead 111 and the outer skin of the negative lead 121.

In addition, as shown in FIGS. 2 and 4, the luminescent light source 5 is provided with a light source positive pin 511 and a light source negative pin 512, the upper end of the luminescent light source 5 is inserted into the inner core accommodating cavity 411 of the plastic inner core 41, the light source positive pin 511 of the luminescent light source 5 is in contact with and in electric communication with the positive contact terminal 112 of the positive lead 111, and the light source negative pin 512 of the luminescent light source 5 is in contact with and in electric communication with the negative contact terminal 122 of the negative lead 121.

It should be explained that the light-transmitting lampshade 6 of the present disclosure is connected with the rubber-coated member 42. Specifically, the rubber-coated member 42 is provided with a lampshade connecting part 421, and the upper end of the light-transmitting lampshade 6 is screwed or clamped with the lampshade connecting part 421.

The rubber-coated member 42 of the present disclosure is injection-molded into an integrated structure with the upper end of the plastic inner core 41, the outer skin of the positive lead 111 and the outer skin of the negative lead 121. The rubber-coated member 42 can effectively make the upper end of the plastic inner core 41 waterproof, so as to improve the waterproof performance of the whole bulb component 3.

It should be noted that the luminescent light source 5 of the present disclosure is connected with the plastic inner core 41 in a pluggable and detachable manner, which is convenient and quick to install and is capable of realizing the rapid replacement and maintenance of the luminescent light source 5.

In addition, compared with the existing copper bulb, the luminescent light source 5 of the present disclosure has a simpler structure and lower manufacturing cost.

According to the above situation, through the above structural design, the present disclosure has the advantages of novel structural design, convenient and quick installation and low manufacturing cost.

As a preferred embodiment, as shown in FIG. 4, the string lamp connecting line 1 is provided with two signal lines 131 extending into the inner core accommodating cavity 411, respectively, and the core of each signal line 131 is welded or riveted with a signal terminal 132, each of the signal terminals 132 extends into the inner core accommodating cavity 411, and the outer skin of each signal line 131 is injection-molded into an integrated structure with the rubber-coated member 42, respectively.

The luminescent light source 5 is provided with a signal pin 52 corresponding to each signal terminal 132, respectively, and each signal pin 52 is in contact with and in electric communication with the corresponding signal terminal 132, respectively.

The signal terminal 132 of the signal line 131 is in contact with and in electric communication with the signal pin 52 of the luminescent light source 5, so that the present disclosure can realize the signal control of the luminescent light source 5 in the lighting process.

As a preferred embodiment, as shown in FIG. 1, FIG. 2, FIG. 4, FIG. 5, FIG. 6, FIG. 7, FIG. 8 and FIG. 9, a plug-in plastic head 53 is provided at the upper end of the luminescent light source 5, the light source positive pin 511, the light source negative pin 512 and the signal pin 52 are exposed to the plug-in plastic head 53, respectively, the plug-in plastic head 53 of the luminescent light source 5 is inserted into the inner core accommodating cavity 411 of the plastic inner core 41, and the plug-in plastic head 53 is buckled with the lower end of the plastic inner core 41.

Specifically, the plug-in plastic head 53 is buckled with the lower end of the plastic inner core 41 in the following manner. Specifically, the plug-in plastic head 53 is provided with a plastic head buckle hole 531, an inner core buckle tongue 412 corresponding to the plastic head buckle hole 531 is provided at the lower end of the inner wall of the inner core accommodating cavity 411, and the inner core buckle tongue 412 of the plastic inner core 41 is buckled in the plastic head buckle hole 531 of the plug-in plastic head 53.

As for the plug-in plastic head 53 of the present disclosure, the light-emitting source 5 of the present disclosure is plugged and unplugged from the inner core accommodating cavity 411 of the plastic inner core 41 by the plug-in plastic head 53, and the plug-in plastic head 53 can ensure the contact stability between the light source positive pin 511 and the positive contact terminal 112, and between the light source negative pin 512 and the negative contact terminal 122.

In addition, the plug-in plastic head 53 of the present disclosure is connected with the plastic inner core 41 by buckling, so that the installation is convenient and quick.

As a preferred embodiment, as shown in FIGS. 2 to 4, the outer surface of the lower end of the plastic inner core 41 is provided with an inner core positioning protrusion 413 protruding outward, and the plug-in plastic head 53 is provided with a plastic head positioning protrusion 532 corresponding to the inner core positioning protrusion 413; when the plug-in plastic head 53 is correctly inserted into the inner core accommodating cavity 411, the inner core positioning protrusion 413 is vertically aligned with the plastic head positioning protrusion 532.

In the process that the user changes the luminescent light source 5 and plugs and unplugs the plug-in plastic head 53, the plastic head positioning protrusion 532 refers to the position of the inner core positioning protrusion 413 of the plastic inner core 41, so as to ensure that the plug-in plastic head 53 of the luminescent light source 5 is correctly inserted into the inner core accommodating cavity 411 of the plastic inner core 41 and ensure the correctness of positive and negative power connection.

As a preferred embodiment, as shown in FIGS. 2 and 4, a plastic isolation column 43 for isolating the positive lead 111 from the negative lead 121 is further embedded in the inner core accommodating cavity 411, and the plastic isolation column 43 is located between the positive contact terminal 112 of the positive lead 111 and the negative contact terminal 122 of the negative lead 121; the upper end of the plastic isolation column 43 is injection-molded into an integrated structure with the rubber-coated member 42.

In addition, the lower end of the plastic isolation column 43 is formed with a resistor mounting hole 431 which runs through the plastic isolation column completely in the transverse direction, a protective resistor 44 is mounted in the resistor mounting hole 431 of the plastic isolation column 43, the protective resistor 44 is provided with a resistor positive pin 441 and a resistor negative pin 442, the resistor positive pin 441 of the protective resistor 44 is in contact with and in electric communication with the positive contact terminal 112 of the positive lead 111, and the resistor negative pin 442 of the protective resistor 44 is in contact with and in electric communication with the negative contact terminal 122 of the negative lead 121.

The plastic isolation column 43 of the present disclosure is used to effectively isolate the positive contact terminal 112 from the negative contact terminal 122.

As for the protective resistor 44 mounted on the plastic isolation column 43, during operation, when one of the bulb components 3 in the string lamp fails due to the luminescent light source 5, the protective resistor 44 in the failed bulb component 3 can still realize the electric communication between the positive contact terminal 112 and the negative contact terminal 122, so that the other non-failed bulb components 3 can still emit light without being affected, which are stable, reliable and good in use effect.

Figure 9:
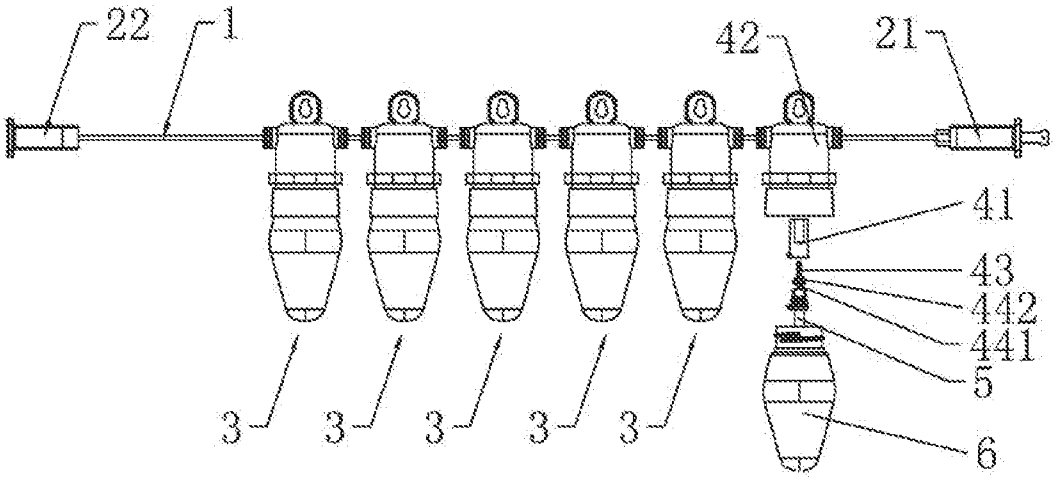
FIG. 9 is a structural schematic diagram of Embodiment 8 of the present disclosure.
Figure 10:
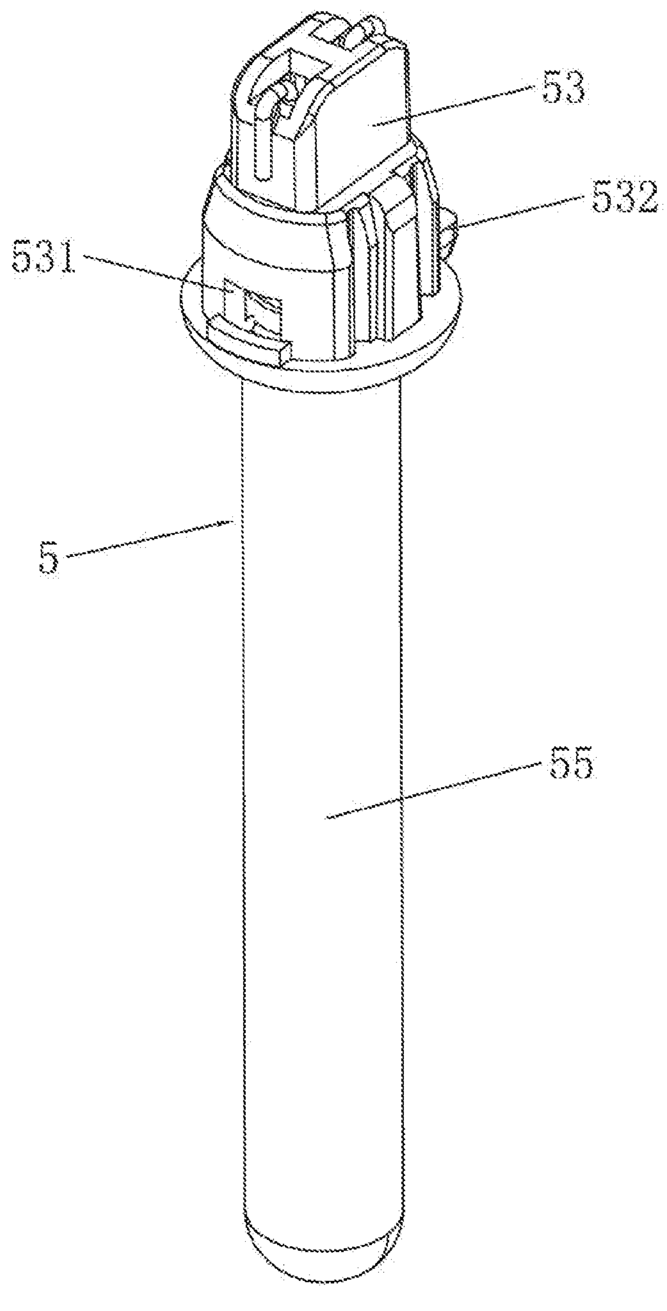
FIG. 10 is a structural schematic diagram of a luminescent light source according to the present disclosure.
Figure 11:
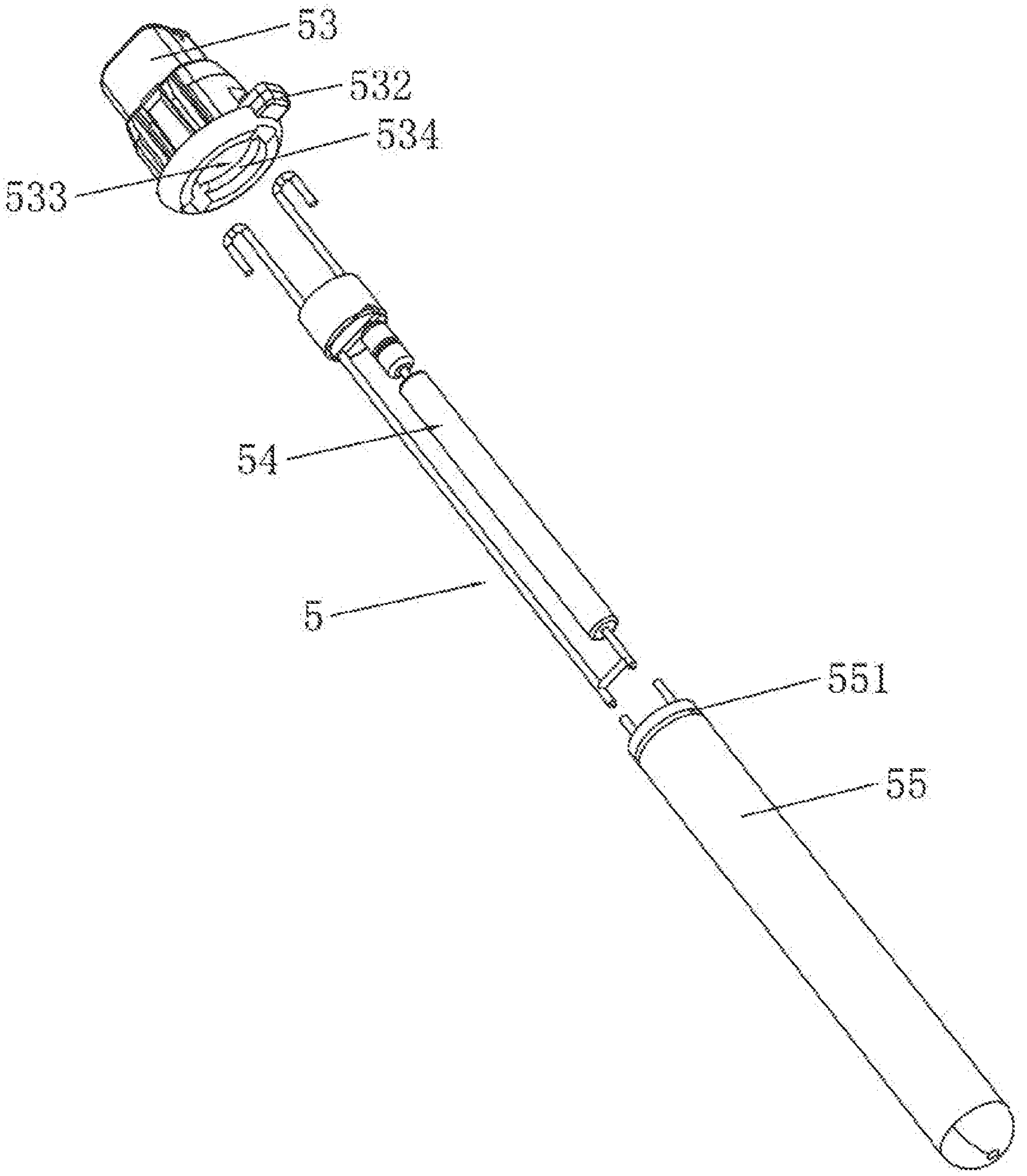
FIG. 11 is an exploded schematic diagram of a luminescent light source according to the present disclosure.

As a preferred embodiment, as shown in FIGS. 9 and 10, the luminescent light source 5 further comprises a luminescent tube 54 and a lamp housing 55, the light source positive pin 511, the light source negative pin 512 and the signal pin 52 are provided in the luminescent tube 54, respectively, and the luminescent tube 54 is embedded in the lamp housing 55.

The plug-in plastic head 53 is provided with a plastic head fixing hole 533 corresponding to the lamp housing, and the upper end of the lamp housing 55 is embedded in the plastic head fixing hole 533 of the plug-in plastic head 53.

Specifically, the inner wall of the plastic head fixing hole 533 is provided with a buckle flange 534, the outer surface of the upper end of the lamp housing 55 is provided with a buckle groove 551, and the buckle flange 534 of the plug-in plastic head 53 is buckled into the buckle groove 551 of the lamp housing 55.

For the luminescent light source 5 of the present disclosure, the plug-in plastic head 53, the luminescent tube 54 and the lamp housing 55 are designed in a split structure, the luminescent tube 54 and the lamp housing 55 can be disassembled and assembled, and the lamp housing 55 and the plug-in plastic head 53 can be disassembled and assembled. The above disassembling and assembling structure design has the advantages of convenient installation and convenient replacement and maintenance.

The above contents are only the preferred embodiments of the present disclosure. According to the idea of the present disclosure, there will be some changes in the specific implementation and application scope for those skilled in the art. The contents of the specification should not be construed as a limitation on the present disclosure.

What is claimed is:

1. A novel plug-in string lamp structure, comprising a string lamp connecting line (1), a male connector (21) electrically connected to one end of the string lamp connecting line (1), and a female connector (22) electrically connected to the other end of the string lamp connecting line (1), wherein the string lamp connecting line (1) is provided with bulb components (3) which are arranged in sequence at intervals along the string lamp connecting line (1), and each of the bulb components (3) comprises a lamp cap (4), a luminescent light source (5) and a light-transmitting lampshade (6), respectively;

wherein the lamp cap (4) comprises a plastic inner core (41), the plastic inner core (41) is formed with an inner core accommodating cavity (411) which runs through the plastic inner core from top to bottom completely, the string lamp connecting wire (1) is provided with a positive lead (111) and a negative lead (121) which are inserted into the inner core accommodating cavity (411), the core of the positive lead (111) is welded or riveted with a positive contact terminal (112), the core of the negative lead (121) is welded or riveted with a negative contact terminal (122), and the positive contact terminal (112) and the negative contact terminal (122) are located in the inner core accommodating cavity (411), respectively;

the lamp cap (4) further comprises a rubber-coated member (42), and the rubber-coated member (42) is injection-molded into an integrated structure with the upper end of the plastic inner core (41), the outer skin of the positive lead (111) and the outer skin of the negative lead (121);

the luminescent light source (5) is provided with a light source positive pin (511) and a light source negative pin (512), the upper end of the luminescent light source (5) is inserted into the inner core accommodating cavity (411) of the plastic inner core (41), the light source positive pin (511) of the luminescent light source (5) is in contact with and in electric communication with the positive contact terminal (112) of the positive lead (111), and the light source negative pin (512) of the luminescent light source (5) is in contact with and in electric communication with the negative contact terminal (122) of the negative lead (121).

2. The novel plug-in string lamp structure according to claim 1, wherein the string lamp connecting line (1) is provided with two signal lines (131) extending into the inner core accommodating cavity (411), respectively, and the core of each signal line (131) is welded or riveted with a signal terminal (132), each of the signal terminals (132) extends into the inner core accommodating cavity (411), and the outer skin of each signal line (131) is injection-molded into an integrated structure with the rubber-coated member (42), respectively;

the luminescent light source (5) is provided with a signal pin (52) corresponding to each signal terminal (132), respectively, and each signal pin (52) is in contact with and in electric communication with the corresponding signal terminal (132), respectively.

3. The novel plug-in string lamp structure according to claim 2, wherein a plug-in plastic head (53) is provided at the upper end of the luminescent light source (5), the light source positive pin (511), the light source negative pin (512) and the signal pin (52) are exposed to the plug-in plastic head (53), respectively, the plug-in plastic head (53) of the luminescent light source (5) is inserted into the inner core accommodating cavity (411) of the plastic inner core (41), and the plug-in plastic head (53) is buckled with the lower end of the plastic inner core (41).

4. The novel plug-in string lamp structure according to claim 3, wherein the plug-in plastic head (53) is provided with a plastic head buckle hole (531), an inner core buckle tongue (412) corresponding to the plastic head buckle hole (531) is provided at the lower end of the inner wall of the inner core accommodating cavity (411), and the inner core buckle tongue (412) of the plastic inner core (41) is buckled in the plastic head buckle hole (531) of the plug-in plastic head (53).

5. The novel plug-in string lamp structure according to claim 3, wherein the outer surface of the lower end of the plastic inner core (41) is provided with an inner core positioning protrusion (413) protruding outward, and the plug-in plastic head (53) is provided with a plastic head positioning protrusion (532) corresponding to the inner core positioning protrusion (413);

when the plug-in plastic head (53) is correctly inserted into the inner core accommodating cavity (411), the inner core positioning protrusion (413) is vertically aligned with the plastic head positioning protrusion (532).

6. The novel plug-in string lamp structure according to claim 3, wherein the luminescent light source (5) further comprises a luminescent tube (54) and a lamp housing (55), the light source positive pin (511), the light source negative pin (512) and the signal pin (52) are provided in the luminescent tube (54), respectively, and the luminescent tube (54) is embedded in the lamp housing (55);

the plug-in plastic head (53) is provided with a plastic head fixing hole (533) corresponding to the lamp housing, and the upper end of the lamp housing (55) is embedded in the plastic head fixing hole (533) of the plug-in plastic head (53).

7. The novel plug-in string lamp structure according to claim 6, wherein the inner wall of the plastic head fixing hole (533) is provided with a buckle flange (534), the outer surface of the upper end of the lamp housing (55) is provided with a buckle groove (551), and the buckle flange (534) of the plug-in plastic head (53) is buckled into the buckle groove (551) of the lamp housing (55).

8. The novel plug-in string lamp structure according to claim 1, wherein a plastic isolation column (43) for isolating the positive lead (111) from the negative lead (121) is further embedded in the inner core accommodating cavity (411), and the plastic isolation column (43) is located between the positive contact terminal (112) of the positive lead (111) and the negative contact terminal (122) of the negative lead (121);

the upper end of the plastic isolation column (43) is injection-molded into an integrated structure with the rubber-coated member (42).

9. The novel plug-in string lamp structure according to claim 8, wherein the lower end of the plastic isolation column (43) is formed with a resistor mounting hole (431) which runs through the plastic isolation column completely in the transverse direction, a protective resistor (44) is mounted in the resistor mounting hole (431) of the plastic isolation column (43), the protective resistor (44) is provided with a resistor positive pin (441) and a resistor negative pin (442), the resistor positive pin (441) of the protective resistor (44) is in contact with and in electric communication with the positive contact terminal (112) of the positive lead (111), and the resistor negative pin (442) of the protective resistor (44) is in contact with and in electric communication with the negative contact terminal (122) of the negative lead (121).

10. The novel plug-in string lamp structure according to claim 1, wherein the rubber-coated member (42) is provided with a lampshade connecting part (421), and the upper end of the light-transmitting lampshade (6) is screwed or clamped with the lampshade connecting part (421).

* * * * *